July 9, 1968    J. D. BEATTIE    3,391,786
FILTERING DEVICE AND METHOD
Filed July 23, 1965    2 Sheets-Sheet 1
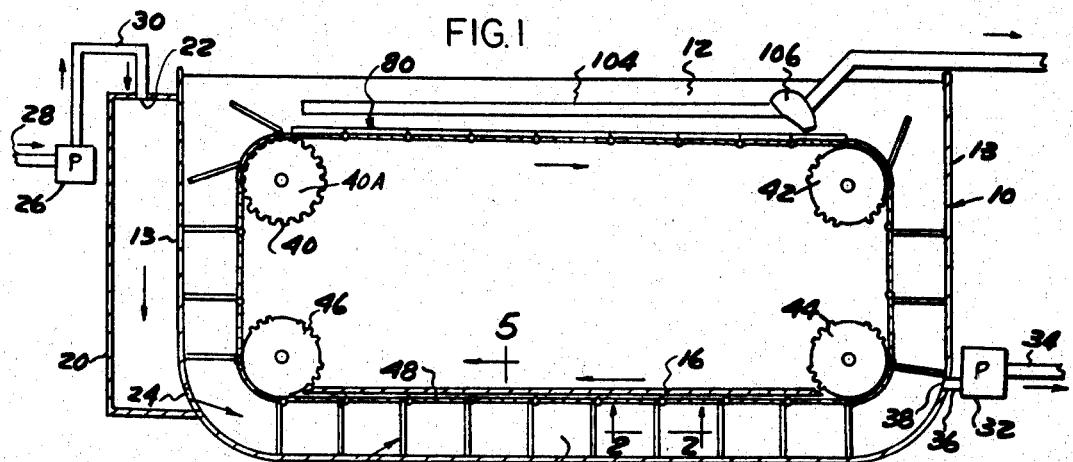
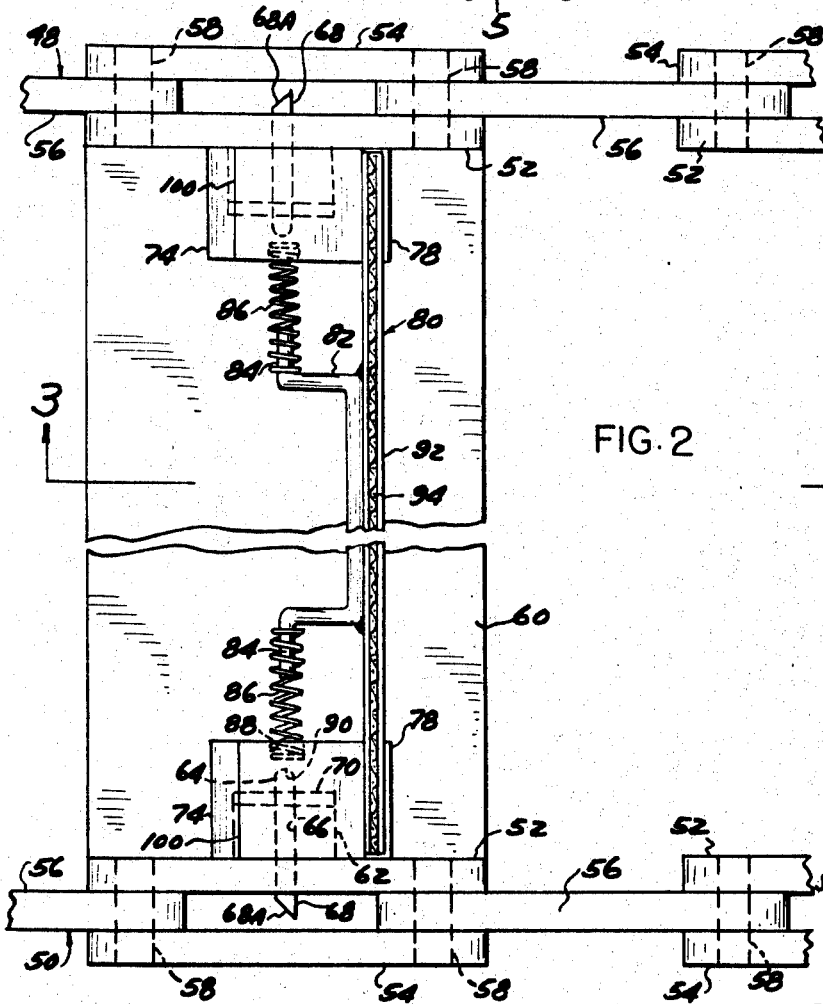
INVENTOR
JOSEPH D. BEATTIE
BY *Henke & Henke*
ATTORNEYS

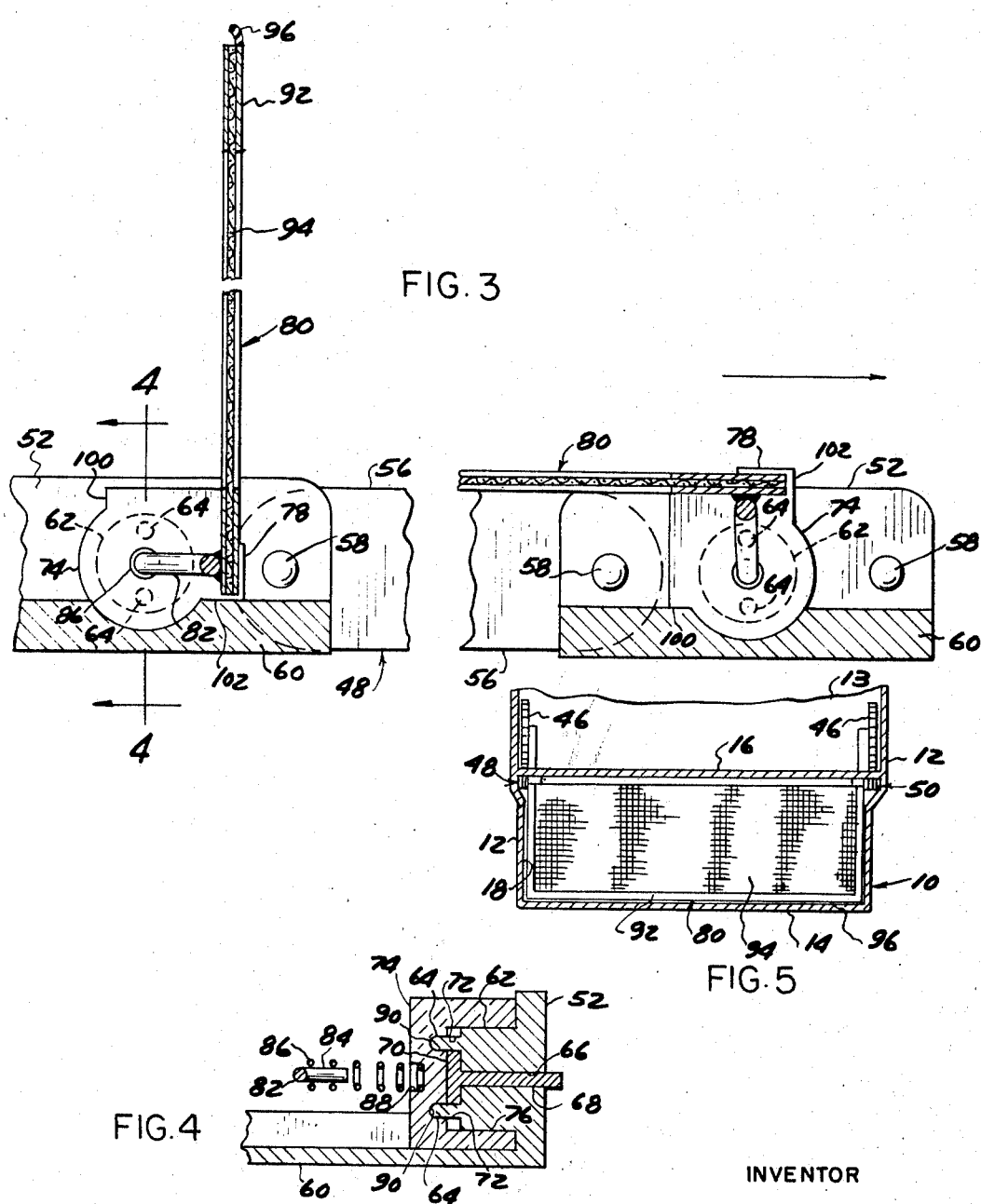

United States Patent Office 3,391,786
Patented July 9, 1968

3,391,786
FILTERING DEVICE AND METHOD
Joseph D. Beattie, 22794 Almond,
East Detroit, Mich. 48021
Filed July 23, 1965, Ser. No. 474,238
12 Claims. (Cl. 210—67)

ABSTRACT OF THE DISCLOSURE

A system for filtering large volumes of water by moving a plurality of separately spaced filtering elements successively through a body of liquid by means of a continuous conveyor and thereafter drying and removing the filtered matter from the filtering elements before they are returned to the body of liquid.

My invention relates to filtering devices and more particularly to an improved means and methods of continuously filtering large volumes of liquid.

The problem of water pollution and clogging of lakes and streams with decayed vegetation, rubbish and the like in recent years has become very serious. Numerous schemes for solving the problems have been proposed, but generally they are expensive and not fully effective, because of the large volumes of water involved and the further problem of disposition of the foreign matter after it is removed.

Dredging of lakes, for example, is not too successful because the accumulated rubbish and vegetation which is dumped on the beach rapidly gets returned to the lake, and trucking it away is expensive even if some convenient dumping place can be found.

In my invention, I propose not only to clean water by a high volume continuous filtering system, but to prepare for use the filtered matter which, on analysis, has been found to be a low-grade peat humus. This matter is produced economically and in sufficient volume in the present system to make the operation highly advantageous.

The main object of my invention is to produce a highly effective filtering system by pumping liquid through a passage and continuously conveying a plurality of filtering elements in a counter direction through the passage, thereafter drying and removing the filtered matter from the filtering elements before they are returned to the passage.

This and other objects and advantages of the invention will be more apparent from the following description of a preferred embodiment of my invention and the accompanying drawings in which like reference characters refer to like parts throughout the several views and in which FIG. 1 is a longitudinal cross-sectional diagrammatic view of a preferred embodiment of the invention.

FIG. 2 is a fragmentary view as seen substantially from the line 2—2 of FIG. 1.

FIG. 3 is a cross-sectional view taken substantially on the line 3—3 of FIG. 2 but also indicating two positions of the filter elements.

FIG. 4 is a fragmentary cross-sectional view taken substantially on the line 4—4 of FIG. 3, and FIG. 5 is a cross-sectional view taken substantially on the line 5—5 of FIG. 1.

As shown in FIGS. 1 and 5, the invention comprises a large tank or housing 10 which, when the device is used to clean large bodies of water, may be installed in or be an integral part of a barge, boat or amphibious vehicle (not shown), or could be a shore installation with a large long intake hose carried to any location on the lake by a smaller boat.

Although the invention is here described in relation to this environment, it will readily be seen that the principles involved may be used in many applications where filtering of liquid is desired, and the structure itself may be made of different sizes.

The housing 10 has side walls 12, end walls 13, and bottom 14, but is preferably, although not necessarily, open at the top. Near the bottom 14 is another horizontal wall 16 forming, with the lower portions of the side walls 12 and the bottom 14 a longitudinal tunnel or passage 18.

A tank 20 is preferably provided at one end of the housing 10, and has an inlet 22 at the top and an outlet 24 at the bottom adjacent what is here designated as the upstream end of the passage 18. A pump 26, which may be located either with or remote from the housing 10, is provided with an inlet hose 28 and an outlet hose 30 leading to the inlet 22 of the tank 20.

A second pump 32 has a discharge pipe 34 and an inlet pipe 36 connected with an outlet 38 in the other housing end wall 13 adjacent what is here designated as the downstream end of the passage 18.

In operation, water from the lake is pumped by the pump 26 from the inlet hose 28 to the outlet hose 30 into the tank 20, thence through the outlet 24 into the passage 18, flowing from left to right in FIG. 1, thence is pumped by pump 32 from the outlet 38 through the inlet pipe 36 and discharged back into the lake through the pipe 34.

Sets of sprockets 40 and idlers 42, 44 and 46 are mounted in the housing 10 exteriorly of the passage 18 as shown and are operated by any preferred motor (not shown) to move continuous conveyor chains 48 and 50 through the passage 18 from the downstream to the upstream ends, then up and returning along the upper side of the housing 10, then back down and into the downstream side of the passage 18.

The conveyor chains 48 and 50, as seen in FIGS. 2–4, comprise links 52 which will be described, links 54, and interconnecting links 56, held together with pins 58 as shown.

At uniformly spaced intervals, the links 52 on opposite sides are connected by means of a plate 60 and have on their inner sides inwardly extending cylindrical hubs 62. Each hub has a pair of inwardly extending lugs 64 and a central hole 66 extending through the hub and the link 52.

A pin 68 extending through the hole 66 has a flange 70 of the same diameter as the hub 62 and a pair of holes 72 which axially slidably mount over the two lugs 64 of the hub 62.

A bracket 74 having a central recess 76 is provided to be axially slidably carried on each hub 52 and has a flange 78 so that the two brackets 74 at the oppositely located hubs 62 can slidably carry the corners of a flat filtering element 80 as seen in FIGS. 2 and 3. A U-shaped rod 82 is secured to one side of the filter element 80 and has oppositely outwardly extending ends 84 each of which carry an end of coil spring 86, the two springs being compressed to a degree and having their other ends seated in recesses 88 of the brackets 74 as shown in FIG. 4.

The inner recess 76 of each bracket has a pair of holes 90 which fit over the lug 64 of a respective hub 62.

It will be seen that, in the position shown in FIGS. 2 and 4, the brackets 74 and the hubs 62 are engaged so that the flat filter elements extend outwardly from the conveyor chains 48 and 50 as shown in the left-hand portion of FIG. 3. In these positions, the filter elements are successively carried by the chains 48 and 50 through the passage 18 in a direction counter to liquid flow.

The filter elements 80 themselves preferably comprise rectangular frames 92 holding flat filter screens 94 of any preferred material. Heat resistant flexible seals 96 may extend peripherally around the frames 92 to seal against the inner surfaces of the passage 18, or the frames 92 may be fitted closely to the walls of the passage 18 to provide sealing, the walls of the passage 18 being lined with any suitable sealing material which need not be heat resistant.

As the chains 48 and 50 pass over the sprockets 40 shown in FIG. 1, a sprocket tooth 40A will move into the space between the links 52 and 54, and will inwardly depress the pins 68 extending through the hubs 62 and links 52, the pins 68 having suitably bevelled ends 68A as seen in FIG. 2 for camming them inwardly.

When the pins 68 are thus depressed, the brackets 74 will be disengaged from the two lugs 64 of the hubs 62 so that the brackets 74 and the filter element 80 carried thereby will rotate about the hub, falling flat during the upper portion of their travel as seen in FIG. 1. The brackets 74 each have shoulders 100 and 102 which engage when in the respective flat and extended positions on the plate 60 to locate the filter elements 80 in the two described positions.

It will be seen that the idler wheels 42, 44 and 46 have teeth missing such that none of these idler teeth will engage the actuating pins of the hubs 62.

As seen in FIG. 1, the filter elements 80 are, when disengaged or unlocked as previously described, disposed to lie in a common plane on the upper return portion of their travel, forming a flat bed on which will be carried all of the foreign matter extracted from the liquid during their upstream travel through the passage 18.

A dryer device 104 of any preferred type, such as a radiant gas burner or hot air blower, is disposed closely overlying the filter elements 80 on their return travel, and operates to completely evaporate all the liquid and leave a dry residue on the filter screens 94. At the right end (as seen in FIG. 1) is a vacuum removal device 106 which operates to clean the screens 94. The material removed can be disposed of in any manner, either by discharge into a barge or delivery to a bagging station for commercial use.

As the filter elements 80 are carried by the chains 48 and 50 over the idler 42 they will fall into their extended position and the brackets 74 will reengage the lugs 64 so that the filter elements are once more locked in position to be carried once more through the passage 18.

It will be noted that, although a great many filter screens 94 are disposed across the flow of liquid in the passage 18, the larger foreign matter such as weeds, leaves and larger debris entering from the inlet 24 is immediately caught and carried out of the flow path by the most upstream successively encountered filter elements 80, so that liquid flow through the other filter element screens 94 will not be unduly impeded.

By the time the liquid reaches the downstream end of the passage 18, it will have passed through a large number of filter element screens 94 and is quite clean for return to the lake.

Although I have described only one embodiment and use of my invention, it will be apparent to one skilled in the art to which the invention pertains that various changes and modifications may be made therein without departing from the spirit of the invention or the scope of the appended claims.

I claim:

1. A method of filtering large volumes of liquid, comprising the successive continuous steps of,
   (a) pumping liquid in one direction through a longitudinal passage,
   (b) moving a plurality of separate spaced substantially vertically disposed filtering elements successively through said passage counter to liquid flow,
   (c) withdrawing said filtering elements from said passage at its upstream end,
   (d) successively positioning said filtering elements in a substantially horizontal common plane,
   (e) drying the filtered matter on said filter elements,
   (f) removing filtered matter from successive filtering elements, and
   (g) returning said filtering elements to their substantially vertically disposed position prior to their entry into said passage at its downstream end.

2. A device for filtering large volumes of liquid comprising
   (a) a generally elongated housing having a longitudinal substantially horizontally disposed passage,
   (b) means pumping liquid in one direction through said passage,
   (c) a continuous conveyor having a lower run moving into said passage at its downstream end and out of said passage at its upstream end, and an upper run exterior of said passage and moving counter to said lower run,
   (d) a plurality of filtering elements pivotally carried on said conveyor successively carried through said passage by said conveyor and extending transversely thereof to intersect liquid flowing therethrough,
   (e) means for locking said filter elements in their transverse position prior to their entry into said passage;
   (f) means for unlocking said filter elements prior to their reaching said upper run for disposing said filtering elements in a common plane while same are being moved along said upper run,
   (g) means disposed above said upper run for drying said filtered material while still on said filtering elements, and
   (h) means disposed adjacent the end of said upper run for removing filtered material from said filtering elements prior to return thereof into said passage.

3. The device as defined in claim 2 and having a vacuum means for removing filtered material from said filtering elements while same are in said common plane exteriorly of said passage.

4. The device as defined in claim 2 and in which
   (a) said conveyor and filtering elements have resiliently biased means cooperating to retain said elements in locked position extending across said passage when moving therethrough,
   (b) means actuated to unlock said filtering elements and rotate same 90 degrees into said common plane exteriorly of said passage.

5. The device as defined in claim 4 and including
   (a) sprocket wheels exteriorly of said passage and carrying said conveyor, and
   (b) means engaged by at least one of said sprocket wheels to actuate said unlocking means.

6. The device as defined in claim 2, wherein said filtering elements are disposed substantially end to end with regard to each other while same are being moved along said upper run.

7. A device for filtering large volumes of liquid comprising:
   (a) a generally elongated housing having a fluid containing chamber adjacent the bottom thereof;
   (b) a continuous conveyor having a lower substantially horizontal run moving into said chamber at one end and out of said chamber at its opposite end, and an upper substantially horizontal run exterior of said chamber and moving counter to said lower run;
   (c) a plurality of filtering elements pivotally mounted on said conveyor at spaced intervals successively carried through said chamber by said conveyor and extending transversely thereof to intersect liquid therein,
   (d) means for locking said filter elements in their transverse position prior to their entry into said chamber, (e) means for unlocking said filter elements prior to their reaching said upper run for disposing said filtering elements in a substantially horizontal common plane while same are being moved along said upper run, (f) means disposed above said upper run for drying the filtered material while still on said filtering elements, and (g) means disposed adjacent the end of said upper run for removing the dried filtered material from said filtering elements.

8. The device as defined in claim 7, wherein said filtering elements are disposed substantially end to end with regard to each other while same are being moved along said upper run.

9. The device as defined in claim 8 and in which (a) said conveyor and filtering elements have resiliently biased means cooperating to retain said elements in locked position extending across said chamber when moving therethrough, (b) means actuated to unlock said filtering elements and rotate same 90 degrees into said common plane.

10. The device as defined in claim 9 and including (a) sprocket wheels exteriorly of said passage and carrying said conveyor, and (b) means engaged by at least one of said sprocket wheels to actuate said unlocking means.

11. The device as defined in claim 7 and having vacuum means for removing filtered material from said filtering elements.

12. The device as defined in claim 7 and including a sprocket wheel having teeth operatively engageable with said locking means to actuate and unlock same.

References Cited

UNITED STATES PATENTS

| | | | |
|---|---|---|---|
| 1,890,251 | 12/1932 | Fowler | 210—400 |
| 1,914,742 | 6/1933 | Hillier | 210—393 |
| 2,095,504 | 10/1937 | Kesti et al. | 210—160 |
| 2,370,138 | 2/1945 | Bonotto | 210—400 |
| 3,159,574 | 12/1964 | Benson | 210—400 |

FOREIGN PATENTS 16,946  1914  Great Britain.

SAMIH N. ZAHARNA, *Primary Examiner.*